United States Patent
Haslinger

(10) Patent No.: US 10,762,898 B2
(45) Date of Patent: Sep. 1, 2020

(54) METHOD AND DEVICE FOR OPERATING A SPEECH-CONTROLLED INFORMATION SYSTEM FOR A VEHICLE

(71) Applicant: Bayerische Motoren Werke Aktiengesellschaft, Munich (DE)

(72) Inventor: Andreas Haslinger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 575 days.

(21) Appl. No.: 14/609,812

(22) Filed: Jan. 30, 2015

(65) Prior Publication Data

US 2015/0142449 A1 May 21, 2015

Related U.S. Application Data

(63) Continuation of application No. PCT/EP2013/065560, filed on Jul. 24, 2013.

(30) Foreign Application Priority Data

Aug. 2, 2012 (DE) .................. 10 2012 213 668

(51) Int. Cl.
  *G10L 15/22* (2006.01)
  *B60R 16/037* (2006.01)
  *G10L 15/08* (2006.01)

(52) U.S. Cl.
  CPC .......... *G10L 15/22* (2013.01); *B60R 16/0373* (2013.01); *G10L 2015/088* (2013.01); *G10L 2015/223* (2013.01); *G10L 2015/228* (2013.01)

(58) Field of Classification Search
  CPC ...................................................... G10L 15/22
  (Continued)

(56) References Cited

U.S. PATENT DOCUMENTS

| 5,857,172 A * | 1/1999 | Rozak .................. G06F 3/16 704/200 |
| 7,219,063 B2 * | 5/2007 | Schalk .................. G06Q 30/02 340/988 |

(Continued)

FOREIGN PATENT DOCUMENTS

| CN | 101119873 A | 2/2008 |
| CN | 101462522 A | 6/2009 |

(Continued)

OTHER PUBLICATIONS

International Search Report dated Sep. 27, 2013 with English translation (seven (7) pages).

(Continued)

*Primary Examiner* — Shaun Roberts
(74) *Attorney, Agent, or Firm* — Crowell & Moring LLP

(57) ABSTRACT

A voice input by a vehicle user is taken as a basis for determining at least one keyword from a set of prescribed keywords. The at least one keyword is taken as a basis for determining at least one event and/or at least one state from a set of events and/or states of the vehicle that are stored during a prescribed period of time. This involves the respective event and/or the respective state being stored in conjunction with at least one condition occurrence that characterizes a respective condition that needs to be met in order for the event to occur and/or the respective state to exist. In addition, a response is determined from a set of prescribed responses on the basis of the condition occurrence that is associated with the determined event and/or state. Furthermore, a signaling signal is determined on the basis of the ascertained response.

10 Claims, 2 Drawing Sheets

(58) Field of Classification Search
USPC .......................................... 704/231, 270, 275
See application file for complete search history.

(56) References Cited

U.S. PATENT DOCUMENTS

| | | | |
|---|---|---|---|
| 7,606,715 B1 * | 10/2009 | Krenz | .......................... 704/275 |
| 2008/0254746 A1 | 10/2008 | Krishnan et al. | |
| 2009/0089065 A1 * | 4/2009 | Buck | .................. B60R 16/0373 |
| | | | 704/275 |
| 2009/0164216 A1 | 6/2009 | Chengalvarayan et al. | |
| 2009/0271200 A1 * | 10/2009 | Mishra | ................... G10L 15/30 |
| | | | 704/254 |
| 2011/0093158 A1 * | 4/2011 | Theisen | ................ G06F 9/4446 |
| | | | 701/29.5 |
| 2013/0030811 A1 * | 1/2013 | Olleon | .................... G06F 3/011 |
| | | | 704/267 |

FOREIGN PATENT DOCUMENTS

| | | |
|---|---|---|
| CN | 102393207 A | 3/2012 |
| CN | 102511053 A | 6/2012 |
| DE | 27 14 621 A1 | 10/1978 |
| DE | 10 2007 042 583 A1 | 3/2009 |
| DE | 10 2012 022 630 A1 | 6/2013 |

OTHER PUBLICATIONS

Chinese Office Action issued in Chinese counterpart application No. 201380046943.1 dated Dec. 26, 2016 (Nine (9) pages).

* cited by examiner

METHOD AND DEVICE FOR OPERATING A SPEECH-CONTROLLED INFORMATION SYSTEM FOR A VEHICLE

CROSS REFERENCE TO RELATED APPLICATIONS

This application is a continuation of PCT International Application No. PCT/EP2013/065560, filed Jul. 24, 2013, which claims priority under 35 U.S.C. § 119 from German Patent Application No. 10 2012 213 668.1, filed Aug. 2, 2012, the entire disclosures of which are herein expressly incorporated by reference.

BACKGROUND AND SUMMARY OF THE INVENTION

The invention relates to a method and a corresponding apparatus for operating a voice-controlled information system for a vehicle.

In the automotive sector, voice-based user interfaces are being used to an increasing extent. Besides mobile telephones, navigation applications that are controlled by means of voice operation by virtue of the input of town and/or road names, known destinations, routes and/or points of interest (POI) have essentially been commercially available in motor vehicles to date.

The object on which the invention is based is that of providing a method and an apparatus for operating a voice-controlled information system that allow flexible checking of information and contribute to increasing reliability for the provision of information.

This and other objects are achieved by a method and a corresponding apparatus for operating a voice-controlled information system for a vehicle. A voice input by a vehicle user is taken as a basis for determining at least one keyword from a set of prescribed keywords. The at least one keyword is taken as a basis for determining at least one event and/or at least one state from a set of events and/or states of the vehicle that are stored during a predetermined period of time, wherein the respective event and/or the respective state is stored in conjunction with at least one condition occurrence that characterizes a respective condition that needs to be met in order for the event to occur and/or the respective state to exist. In addition, a response is determined from a set of prescribed responses on the basis of the condition occurrence that is associated with the determined event and/or state. Furthermore, a signaling signal is determined on the basis of the determined response.

Advantageously, the information system can thus also be used by a vehicle driver during a trip. The voice interaction with the information system has the advantage that a vehicle driver, in particular, can continue to observe a current traffic scenario unhindered. Advantageously, it is thus also possible to take account of a current state of surroundings and/or a current operating state of the vehicle when selecting the information to be provided. The use of voice recognition in a suitable form allows unrestricted language by a vehicle user to be evaluated sufficiently reliably. Possible problems that affect the vehicle user can be easily identified on the basis of the keywords and the events. This allows efficient and/or reliable selection and/or filtering-out of the probably required information for the vehicle user. Incorrect or context-free responses can be reduced or even avoided by evaluating the event and/or state history. In addition, the voice interaction with the vehicle can contribute to a kind of personal relationship being formed with the vehicle and hence the wellbeing of a vehicle user is increased when the vehicle is used.

In one advantageous embodiment, the at least one keyword is taken as a basis for determining a content section of a prescribed interactive instruction manual, and the signaling signal is determined on the basis of the content section. The signaling signal can be used for forwarding the response to a further device and/or to a further module for further processing. Advantageously, this allows an interactive instruction manual for the vehicle to be used as an information source for the provision of information for the vehicle user. The instruction manual can include all of the vehicle components, such as the engine, transmission, seat adjustment, radio, navigation device, or just specific vehicle components, for example vehicle components that a vehicle user can operate for personal adjustment. The voice control allows the vehicle user to voice (speak) his question to the vehicle. The determined content section(s) can be output audibly. In addition, graphics and/or images from the instruction manual can be signaled visually.

In a further advantageous embodiment, the response is determined on the basis of a prescribed characteristic property of the vehicle that explicitly identifies the vehicle. This allows individual equipment of the vehicle to be taken into account when determining the response. In particular, it is thus also possible to take account of a change in the equipment of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Elements having the same design or function are provided with the same reference symbols across the figures.

Figure 1:
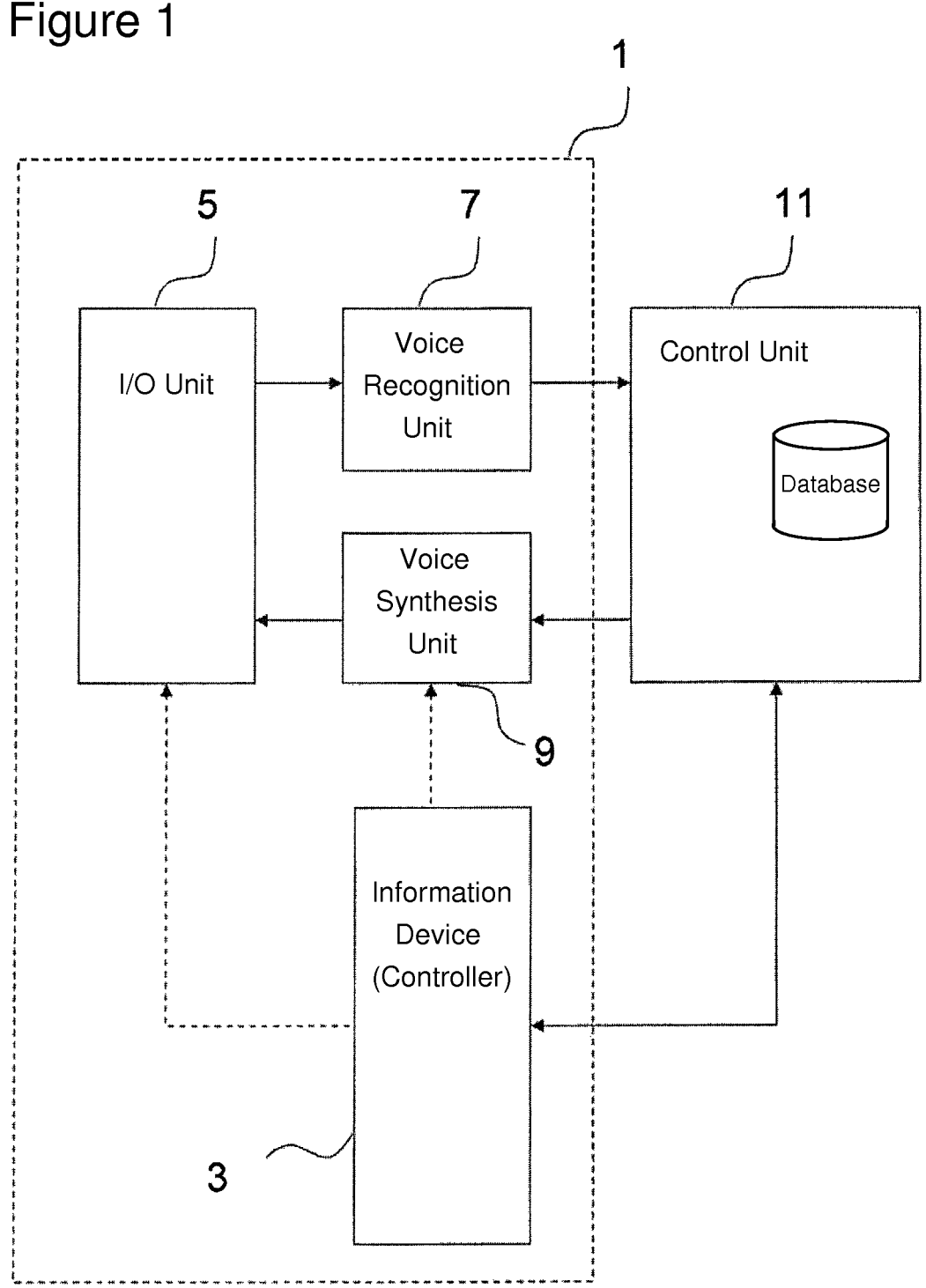
FIG. 1 is a schematic block diagram of a voice-controlled information system with an associated control unit according to an embodiment of the invention.

FIG. 1 shows an exemplary schematic block diagram of a voice-controlled information system 1 for a vehicle. By way of example, the voice-controlled information system 1 includes an information device 3, an input and output unit 5, a voice recognition unit 7 and a voice synthesis unit 9. In addition, FIG. 1 shows a control unit 11, which can also be referred to as an apparatus for operating the voice-controlled information system 1. The control unit 11, the information device 3, the voice recognition unit 7, and/or the voice synthesis unit 9 may be arranged in the vehicle and/or outside the vehicle.

By way of example, the input and output unit 5 includes a microphone, a loudspeaker and a visual display apparatus, for example a display. Alternatively, it is possible for the input and output unit 5 to have an associated visual display apparatus, for example a central vehicle display for a central computation unit of the vehicle, also called a head unit. Alternatively, it is possible for the voice-based information system 1 to have a plurality of further input and/or output units or for the voice-controlled information system 1 to have a plurality of further associated input and/or output units. By way of example, provision may be made for a mobile terminal, for example a smartphone, to be used as an input and/or output unit.

The input and output unit 5 is coupled for signaling purposes to the voice recognition unit 7. By way of example, the voice recognition unit 7 is designed to capture a voice input by a vehicle user, for example a question and/or a voice command, and to ascertain a word and/or a word list that represent the respective voice input. By way of example, the voice recognition unit 7 includes a voice recognition program. By way of example, the voice recognition program is designed to evaluate a human voice input that has been captured in analog or digital form.

By way of example, the voice recognition unit 7 may be based on a whole-word language model and/or on a phoneme-based model. By way of example, the voice recognition unit 7 is designed to evaluate and recognize individual spoken words from the vehicle user and/or spoken word sequences and/or whole sentences. The voice recognition unit 7 may be in speaker-independent or speaker-dependent form. A speaker-independent voice recognition unit can be used by one or more users without a learning and/or training phase for the voice recognition unit 7. By way of example, the voice recognition unit 7 may have a predefined vocabulary. Alternatively or in addition, it is possible for the voice recognition unit 7 to be designed to take a lexicon used by the vehicle user as a basis for customizing and/or extending the vocabulary.

By way of example, previously unknown words can be stored and evaluated. The evaluated previously unknown words can be included in a user-specific dictionary, for example.

By way of example, the control unit 11 is coupled for signaling purposes to the voice recognition unit 7. The control unit 11 is designed to take the voice input by a vehicle user as a basis for determining at least one keyword from a set of prescribed keywords. By way of example, the control unit 11 is designed to take the voice input by the vehicle user as a basis for detecting prescribed keywords. By way of example, the voice recognition unit 7 is, to this end, designed to forward the determined word or the word list that represents the voice input by the vehicle user to the control unit 11, said word or word list then being evaluated by the control unit 11.

For use of the voice-controlled input by a vehicle user, there may be provision, by way of example, for activation of the voice recognition unit 7 and/or the voice synthesis unit 9, for example by the vehicle user. By way of example, the vehicle user can operate a voice input key in order to activate the voice recognition unit 7 and/or the voice synthesis unit 9. By way of example, the voice input key may be arranged on a steering wheel and/or on an operator control element, said operator control element preferably being arranged such that it is accessible to the vehicle driver. By way of example, the operator control element may be arranged in a central console of the vehicle. Alternatively or in addition, it is possible for the voice recognition unit 7 and/or the voice synthesis unit 9 to be in a form such that they can be activated by way of a further voice command.

By way of example, the control unit 11 may have one or more databases in which the prescribed keywords are stored. Alternatively, it is possible for the control unit 11 to have the database and/or at least one further database associated with it, in which the prescribed keywords are stored.

The control unit 11 is additionally designed to take the at least one keyword as a basis for determining at least one associated event and/or at least one associated state from a set of events and/or states that are stored during a predetermined period of time T. By way of example, the control unit 11 is, to this end, coupled to the information device for signaling purposes.

By way of example, at least one of the prescribed keywords has at least one associated prescribed event and/or prescribed state in each case. The information device 3 is designed to detect the prescribed events and/or the prescribed states of the vehicle and to store the prescribed events and/or the prescribed states that occur and/or exist in the vehicle during the predetermined period of time T. In this case, the respective event and/or the respective state is stored in conjunction with at least one condition occurrence that characterizes a respective condition that needs to be met in order for the event to occur and/or the respective state to exist. Advantageously, this allows recognition of the condition on the basis of which the respective event occurred and/or the respective state existed. To this end, the information device 3 may comprise a controller, for example.

The control unit 11 is designed to determine a response from a set of prescribed responses on the basis of the condition occurrence that is associated with the determined event and/or state.

By way of example, the prescribed responses and the association of the responses with the respective condition occurrences may be stored in the database and/or in a complementary database.

In this case, provision may be made for a prescribed characteristic property that explicitly identifies the vehicle, for example a chassis number, to be taken into account for determining the response. Thus, it is possible to take account of individual equipment of the vehicle when determining the response. In particular, it is thus also possible to take account of a change in the equipment of the vehicle.

The database and/or the complementary database that store the keywords and/or the respective responses and/or the associations between the responses and the respective condition occurrences may be in the form of mobile data storage media, for example. The database or databases may be in a form such that they are extendable and/or updateable, for example extendable and/or updateable on a user-specific basis. It is also possible for dialogs that have already been conducted between the respective vehicle user and the vehicle, that is to say the voice input and the associated output response, to be stored in the database. In particular, such dialogs can be transmitted to a backend system of a vehicle manufacturer via prescribed communication links. Particularly in the event of the responses being unsatisfactory to the vehicle user, this issue can be forwarded to the vehicle manufacturer.

By way of example, the information device 3 may additionally include an interactive instruction manual for the vehicle, prescribed content sections of the instruction manual each having at least one of the keywords associated with them.

By way of example, the prescribed responses may include one or more of the content sections from the instruction manual. To this end, the database may include a reference to the respective content section, for example, which is then provided via the information unit.

In this case, provision may likewise be made for the prescribed characteristic property to be taken into account for determining the response. It is thus possible to take account of current individual, even changed, equipment of the vehicle when determining the content section.

The control unit 11 may be designed to take the at least one keyword as a basis for determining a content section of the interactive instruction manual and to determine the signaling signal on the basis of the content section.

By way of example, if it is not possible to determine an associated event and/or an associated state for the determined keyword(s) in the set of stored events and/or states, then the at least one determined keyword can be taken as a basis for determining the content section of the instruction manual.

The prescribed responses and/or the content sections of the instruction manual may be in a text format, a graphics format and/or a further specific data format, for example an audio format. For output of the determined response and/or of the content section, it is possible for the voice synthesis unit 9 to be used, particularly for portions that have a textual data format.

By way of example, the voice synthesis unit 9 is designed to determine a signal for audible signaling of the response and/or the content section. The prescribed responses and/or the content sections of the instruction manual may be available in textual form, for example. The voice synthesis unit 9 may therefore be designed to convert continuous text into a signal that is suitable for actuating an audible signaling apparatus, for example the loudspeaker of the input and output unit 5, such that it outputs an audible signal that represents the continuous text.

Alternatively or in addition, it is possible for the output unit to be used for signaling the determined response and/or the content section.

Preferably, the visual display apparatus can be used for signaling portions that are in a graphics format, and the loudspeaker can be used for portions that are in an audio format.

Figure 2:
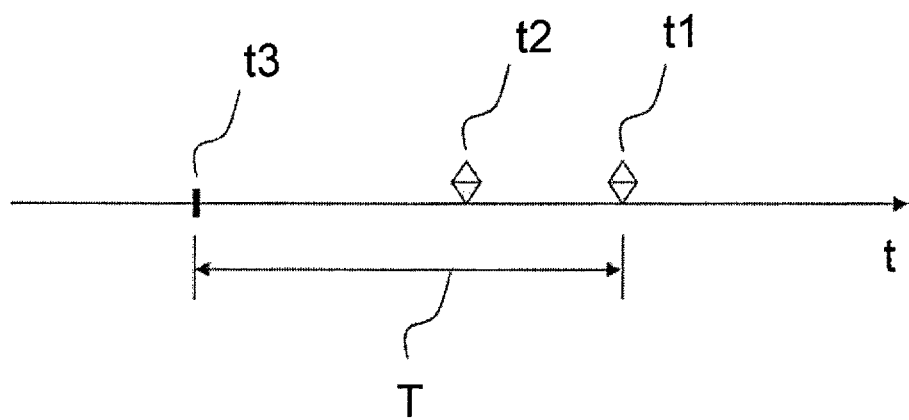
FIG. 2 is a timing diagram of the operation of an exemplary method according to the invention.

FIG. 2 shows a timing diagram to illustrate a timing relationship for the voice input, for example a question from the vehicle user and an event history and/or state history for the vehicle. In this case, t1 characterizes a first instant, at which the vehicle user activates the voice recognition unit 7 and/or the voice synthesis unit 9.

A second instant t2 characterizes an instant at which the actual event has been recognized. A third instant t3 characterizes a beginning of the period of time T during which the prescribed respective events and/or states have been sensed.

If an unexpected event that a vehicle user does not expect and/or that is new to the vehicle user occurs in the vehicle, for example, it is highly probable that the vehicle user will wish to have information about the event at this moment or after just a short delay and will make an appropriate voice input, for example will pose a question that will relate to the event. In this case, there is therefore a high probability of the voice input being correlated to an event sensed and stored at a previous, in particular recent, time.

By way of example, a vehicle user establishes that an engine of the vehicle that has a start/stop function does not stop when pulling up at traffic lights, despite this start/stop function. In this case, the vehicle user could activate the voice-controlled information system 1 and pose a question that asks: "Why doesn't the engine stop?"

By way of example, the following keywords could be determined in this case:
engine
stops
not.

On the basis of these keywords, it is possible, by way of example, to determine the event sensed by the information device 3 that the engine has not been switched off when the vehicle has been stationary for longer than a prescribed minimum standing time. In particular, the event may have been stored in conjunction with at least a condition occurrence that the engine is shut down when a sensed outside temperature is above ±3° C., but this condition was not met.

One possible response to the question from the vehicle user may be as follows: "The engine does not stop because the current outside temperature value is below the setpoint value of ±3° C."

In addition, it is possible for the response to characterize a combination of more than one condition occurrence. By way of example, the start/stop function may be dependent not only on the outside temperature but also on a current state of charge of a vehicle battery.

One possible response to the question from the vehicle user in this case may be as follows: "The engine does not stop because the current outside temperature value is below the setpoint value of +3° C. and the vehicle battery does not have sufficient charge capacity."

In a further exemplary case, the vehicle user establishes that a windshield wiper of the vehicle automatically starts to wipe, for example. In this case, the vehicle user could activate the voice-controlled information system 1 and pose a question that asks: "Why does the windshield wiper switch on?"

By way of example, the following keywords could be ascertained in this case:
windshield wiper
on.

On the basis of these keywords, it is possible to ascertain the event sensed by the information device 3 that the windshield wiper has been activated, for example. In particular, the event may have been stored in conjunction with at least the condition occurrence that the rain sensor has ascertained water on the windshield.

One possible response to the question from the vehicle user may be: "The windshield wiper has been activated because the rain sensor has signaled that it is raining."

LIST OF REFERENCE SYMBOLS

1 Voice-controlled information system
3 Information device
5 Input and output unit
7 Voice recognition unit
9 Voice synthesis unit
11 Control unit
t1 First instant
t2 Second instant
t3 Third instant
T Period of time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for operating a voice-controlled information system for a vehicle, the method comprising the acts of:
sensing vehicle related events and/or vehicle states;
determining at least one keyword of a voice input query of a vehicle user, the at least one keyword being determined from a set of prescribed keywords;
determining a subset of vehicle related events and/or vehicle states, from the sensed vehicle related events and/or vehicle states, which are determined to have occurred during a predetermined period of time leading up to the voice input query;

selecting, based on the determined at least one keyword, a vehicle related event and/or vehicle state from the determined subset of vehicle related events and/or vehicle states that were determined to have occurred during the predetermined period of time;

determining if at least one condition occurrence has been met, wherein the at least one condition occurrence characterizes a respective condition that needs to be met in order for the selected vehicle related event and/or vehicle state to occur;

outputting, based on said determining if the at least one condition occurrence has been met, a response to the voice input query from a set of prescribed responses, wherein the response includes information corresponding to a result of said determining if the at least one condition occurrence has been met.

2. The method according to claim 1, wherein the at least one keyword is taken as a basis for determining a content section of a prescribed interactive instruction manual, and a signaling signal is determined based on the content section, wherein the signaling signal is used for forwarding the response to a further device and/or to a further module for further processing.

3. The method according to claim 2, wherein the response is determined based on a prescribed characteristic property of the vehicle explicitly identifying the vehicle.

4. The method according to claim 1, wherein the response is determined based on a prescribed characteristic property of the vehicle explicitly identifying the vehicle.

5. The method of claim 1, wherein the response includes one of an audible and a visual identification of the at least one condition occurrence that has not been met.

6. An apparatus for operating a voice-controlled information system, comprising:

an input and output unit configured to provide at least one of an audible and a visual output; and a control unit comprising a processor executing a stored program, the stored program having program code segments that:

sense vehicle related events and/or vehicle states;

determine at least one keyword of a voice input query of a vehicle user, the at least one keyword being determined from a set of prescribed keywords;

determine a subset of vehicle related events and/or vehicle states, from the sensed vehicle related events and/or vehicle states, which are determined to have occurred during a predetermined period of time leading up to the voice input query;

select, based on the determined at least one keyword, a vehicle related event and/or vehicle state from the determined subset of vehicle related events and/or vehicle states that were determined to have occurred during the predetermined period of time;

determine if at least one condition occurrence has been met, wherein the at least one condition occurrence characterizes a respective condition that needs to be met in order for the selected vehicle related event and/or vehicle state to occur; and output, via the input and output unit and based on said determining if the at least one condition occurrence has been met, a response to the voice input query from a set of prescribed responses, wherein the response includes information corresponding to a result of said determining if the at least one condition occurrence that has been met.

7. The apparatus according to claim 6, wherein the at least one keyword is taken as a basis for determining a content section of a prescribed interactive instruction manual that includes the information associated with at least one of: the condition occurrence, the vehicle related event, and the vehicle state, and a signaling signal is determined based on the content section, wherein the signaling signal is used for forwarding the response to a further device and/or to a further module for further processing.

8. The apparatus according to claim 7, wherein the response is determined based on a prescribed characteristic property of the vehicle explicitly identifying the vehicle.

9. The apparatus according to claim 6, wherein the response is determined based on a prescribed characteristic property of the vehicle explicitly identifying the vehicle.

10. The apparatus according to claim 6, wherein the response includes one of an audible and a visual identification of the at least one condition occurrence that has not been met.

* * * * *